United States Patent [19]

Imler et al.

[11] Patent Number: 5,447,424
[45] Date of Patent: Sep. 5, 1995

[54] CROSS BEAM LOCK FOR TIRE PRESS

[75] Inventors: Donald C. Imler, Volant, Pa.; Dirk A. Keller, Salem, Ohio

[73] Assignee: National Feedscrew & Machining, Ind. Inc., Massillon, Ohio

[21] Appl. No.: 145,768

[22] Filed: Oct. 29, 1993

[51] Int. Cl.6 .................................. B29C 35/02
[52] U.S. Cl. ............................ 425/34.1; 425/47; 425/171; 425/451.9
[58] Field of Search ............ 425/28.1, 29, 34.1, 425/34.3, 47, 171, 451.9

[56] References Cited

U.S. PATENT DOCUMENTS

| | | | |
|---|---|---|---|
| 4,453,902 | 6/1984 | Imbert | 425/47 |
| 5,102,319 | 4/1992 | Hamilton et al. | 425/47 |
| 5,186,953 | 2/1993 | Minaudo | 425/47 |
| 5,194,267 | 3/1993 | Funakoshi et al. | 425/47 |
| 5,316,458 | 5/1994 | Lesneski | 425/47 |

FOREIGN PATENT DOCUMENTS 3625103  2/1988  Germany ....................... 425/47

*Primary Examiner*—James P. Mackey
*Attorney, Agent, or Firm*—Rankin, Hill, Lewis & Clark

[57] ABSTRACT

A tire curing press has a cross beam that carries the upper mold section and is moved to open and close the press. When the press is closed, a cross beam locking mechanism located in the middle of the cross beam holds the cross beam to the tire press base that carries the bottom mold section. The locking mechanism prevents bending or bowing of the cross beam which would otherwise adversely affect the quality of the tires produced in the press.

12 Claims, 4 Drawing Sheets

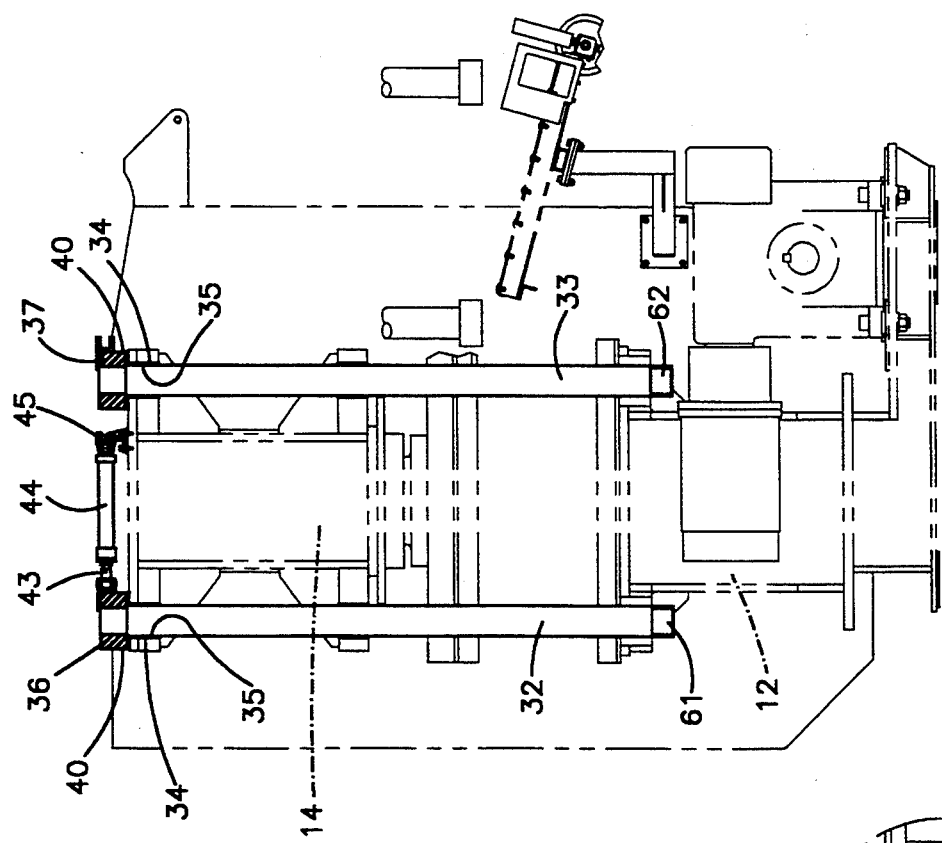
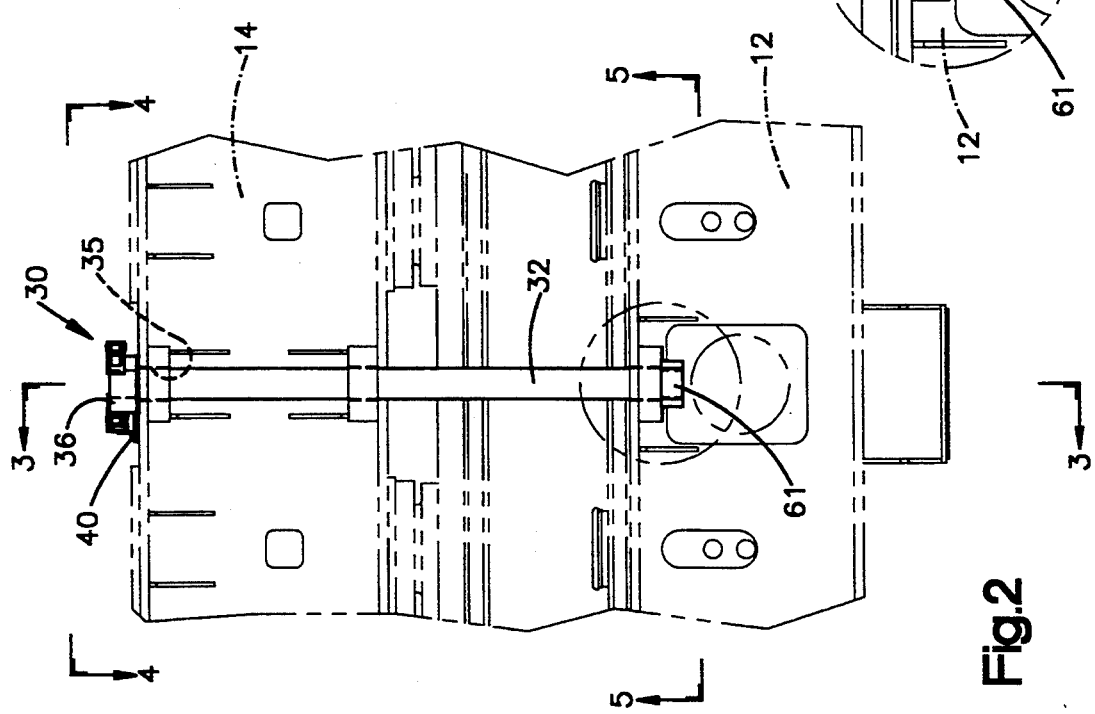

CROSS BEAM LOCK FOR TIRE PRESS

BACKGROUND OF THE INVENTION

1. Field of the Invention

This invention relates to tire curing presses, and especially presses having a cross beam that is moved vertically to open and close the press. In particular, the invention relates to the stabilization of this cross beam during the tire curing process.

2. Description of the Prior Art

In automatic tire presses, such as those used in the manufacture of radial cord tires, a torroidal uncured tire carcass is loaded in a bottom mold section when the press is open and the top mold section then closes on top. A segmented or a two-piece tread mold assembly may be provided, and it is moved to a closed position to provide the tread forming portion of the mold. Then a forming bag or bladder is inflated within the carcass prior to the closing the press to assist in shaping the tire during the curing process.

In automatic tire presses generally referred to as slide-back presses, the top mold section is mounted on a cross beam which moves directly upward after the curing operation and then laterally away from the bottom mold section which is mounted in the base of the tire press. This positions the shaped tire at a location where it may be stripped from the top mold section and dropped on a conveyor, or the like.

During the tire molding operation, the movable cross beam is subjected to substantial pressures, and the beam has a tendency to bow or bend. Such bowing or bending can have a deleterious effect on the tire molding operation if allowed to occur. Even a slight amount of bending or bowing causes the middle of the cross beam to be spaced from the base of the press. This spacing can change the registry of the upper mold section with the lower mold section and can adversely affect the quality of the tires produced by the mold. Similar problems can occur in tilt-back tire presses.

To prevent this bending or bowing of the cross beam, the cross beams have been made larger and stronger. However, this adds to the cost of the tire press. In addition, the larger heavier cross beam is more difficult to move when the press is opened and is more difficult to position as it closes.

SUMMARY OF THE INVENTION

The present invention overcomes the difficulties of the prior art by providing locking the cross beam in place to reduce or eliminate the tendency of the beam to bow or bend when subjected to substantial pressures during the tire molding process.

In accordance with the present invention, a cross beam locking mechanism is provided which locks the middle of the cross beam to the base of the tire press. This locking mechanism effectively prevents bowing or bending of the middle of the cross beam during the curing operation and maintains the cross beam in position through the cure, so that the mold sections are properly positioned with each other and the quality of the tire is not adversely affected.

The locking mechanism includes a pair of posts, one at the front of the cross beam and the other at the rear of the cross beam. Both of the posts are located at approximately the middle of the cross beam, approximately equidistant from the side plates, which is the location where the greatest amount of bowing or bending is likely to occur.

By locking the locking posts at the middle of the cross beam in a dual-cavity tire press, the access to the molding cavities is not affected, since the posts are located between the molding cavities.

Both of the posts are mounted to extend downwardly from the cross beam, and the bottom of each of the posts is locked in openings in the base to restrict movement of the middle of the cross beam relative to the base.

The invention includes an automatic actuation mechanism to lock and unlock the posts from the openings in the tire press base. The actuation mechanism includes a cylinder piston assembly which is connected to the posts to rotate the posts. T-blocks on the bottom of the posts fit within corresponding shaped openings in the base, and the T-blocks lock and unlock the bottom of the posts in the base when the posts are rotated. The posts are attached to each other by a connecting bar, so that they rotate together.

To monitor proper operation of the locking mechanism, contact switches are provided adjacent to the top of the one of the posts. The switches are actuated when the post is in the locked or unlocked position.

These and other advantages are provided by the present invention of a tire press which comprises a base, a cross beam which is movable toward and away from the base to open and close the tire press, and a locking mechanism attached at one end to the cross beam and attached at the other end to the base for maintaining a fixed distance between the cross beam and the base and for reducing bending of the cross beam.

BRIEF DESCRIPTION OF THE DRAWINGS

FIG. 2 is a detailed view of a portion of FIG. 1 showing the cross beam locking mechanism.

FIG. 2A is a detail of a portion of FIG. 2 to a larger scale.

FIG. 3 is a side sectional view of the cross beam locking mechanism taken along line 3—3 of FIG. 2.

DETAILED DESCRIPTION OF THE PREFERRED EMBODIMENT

Figure 1:
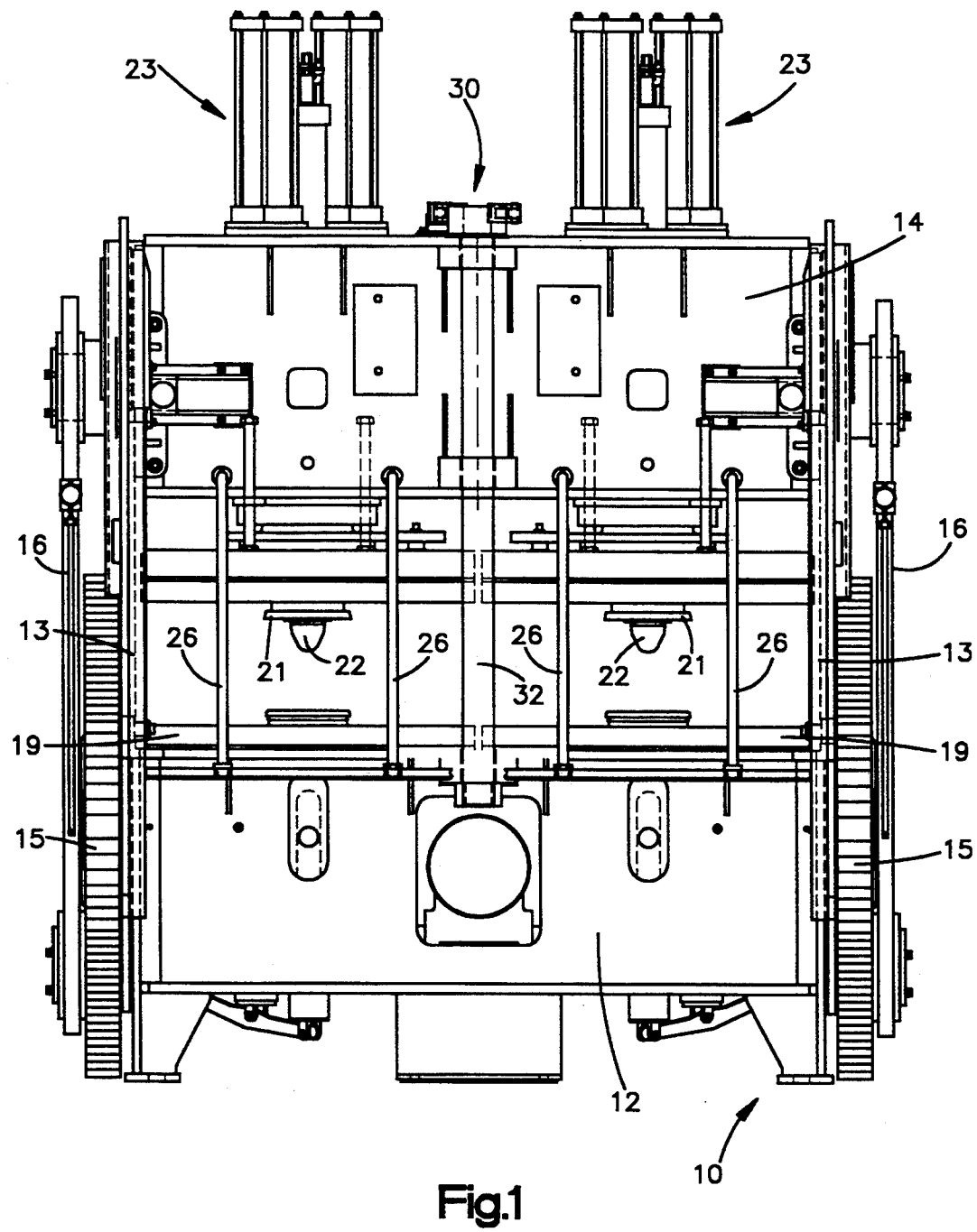
FIG. 1 is a front elevational view of a tire press including the cross beam locking mechanism of the present invention.

Referring more particularly to the drawings and initially to FIG. 1, there is shown a dual slide-back-type tire press 10 adapted for use in curing radial tires. More particularly, the press 10 is a type that utilizes segmented tread molding sections capable of moving radially between an inwardly extended position wherein they define the tread portion of the tire. These radial sections, along with an upper sidewall mold section and a lower sidewall mold section, define a tire curing cavity having a vertical axis.

The press 10 is adapted to receive a raw uncured tire carcass that has been built in a torroidal form as is standard practice in the production of radial cord vehicle tires. The raw uncured tire is loaded into the press 10 from the front of the press using a loading mechanism and is initially positioned in a lower sidewall mold section and an upper mold section is lowered into a position, while at the same time, the segmented tread mold sections are moved radially inward to define a curing cavity. Then a forming bladder is inflated inside the torroidal tire carcass to shape the tire and to correctly position the carcass on the lower mold section. The mold is then closed, and the tire curing operations begins.

After the tire is cured, the upper sidewall mold section is moved vertically upward, the segmented tread molding sections are retracted radially outward and the tire is stripped from the lower sidewall mold section and carried away while still in the upper sidewall mold section, to a position where it is ejected onto a conveyor or the like.

General Arrangement

Referring to FIG. 1, the press 10 has a base 12 and a pair of vertical side plates 13 secured at opposite ends of the base. Each of the side plates 13 has a guide slot for a guide roller which is secured to the upper press head or cross beam 14. The cross beam 14 spans from one side of the press to the other. Journalled in each end of the base 12 is a crank wheel 15. Each crank wheel 15 carries a link 16 that is connected at its other end to an end of the cross beam 14.

Each of the guide slots in the vertical side plates 13 defines a curved cam surface. A cam follower connected to each end of the cross beam 14 moves within one of the slots and guides the movement of the cross beam through a vertical path of travel as it moves into and out of molding position and for generally horizontal travel away from the axis of the mold cavity to a position where a cured tire may be ejected onto a conveyor or the like.

The bottom press portion or base 12 is adapted for a pair of lower mold sections to be fixedly mounted in the base in a side-by-side relationship. Each of the mold sections is formed with an annular cavity which constitutes molding surfaces for the bottom bead, bottom side wall and the lower half of the tread. Also formed within the base 12 is a bladder well adapted to receive, when deflated, a forming bag or bladder which may be inflated and expanded inside the torroidal uncured tire carcass when the carcass is in the mold. The forming bladder which has an annular bead ring which is retained at the top of the well. When the forming bladder is inflated during the curing process, it assumes an oblate spheroidal shape within the uncured tire carcass. When the forming bladder is deflated, it can be forced by a ram downwardly into the bladder well.

The upper press portion, includes the cross beam 14, is adapted to carry a complementary pair of side-by-side downwardly facing mold sections mounted at the bottom of the cross beam. Each of the upper mold sections includes a segmented tread mold assembly which has a plurality of radial tread segments located symmetrically about the central axis. Each mold section also includes a tire unloader that includes a chuck 21 that includes a ram 22. Each unloader is operated by a center mechanism 23 that includes a segmented mold operating mechanism and a ram ejector mechanism. This center mechanism is described in detail in U.S. patent application Ser. No. 08/058,468.

The type of tire press shown in FIG. 1 is often referred to as a slide-back tire press. Examples of presses of this type which can be used with the locking mechanism of the press invention are presses manufactured and sold by Rogers Industrial Products, Inc. of Akron, Ohio, by Mitshubishi Heavy Industries America, Inc., Tire Machinery Division, of Akron, Ohio, and by McNeil & NRM, Inc. of Akron, Ohio. The general construction and operation of this type of press is shown and described, for example, in U.S. Pat. Nos. 3,097,394 and 3,065,499.

The press 10 is shown in an closed position in FIG. 1 with a space between the cross beam 14 and the base 12 to allow the positioning of the upper and lower mold sections. Extending vertically across this space on the front of the press are safety bars 26 that protect the operator from inadvertent insertion of foreign matter into the tire press as the press closes.

When the press is closed and curing is occurring, the cross beam is subjected to substantial pressures that tend to push it upwardly so that the mold will open. Due to the length of the cross beam in a dual tire press such as that shown, these forces are greatest at the middle of the cross beam between the two molding cavities. In accordance with this invention, the bowing or bending of the cross beam is prevented by means of a locking mechanism 30 shown in FIG. 1, Locking Mechanism Referring to FIG. 1, the locking mechanism 30 includes a pair of locking posts 32 and 33 which are shown more clearly in FIGS. 2 and 3. Each of the posts 32 and 33 is mounted within bearings 34 in openings 35 in the cross beam 14 and extends downwardly from the cross beam. Pivot arms 36 and 37 are mounted on top of the posts 32 and 33. The pivot arm 36 is secured to the top of the front post 32 with dowels 38, and the pivot arm 37 is secured to the top of the rear post 33 with dowels 39. The pivot arms 36 and 37 are mounted on the top of the cross beam, and thrust washers 40 are provided between the pivot arms and the top surface of the cross beam to facilitate rotation of the pivot arms. The front pivot arm 36 includes a pair of opposed extensions 41 and 42 which extend horizontally outwardly from the top of the post 32. The extension 41 is attached to a piston rod 43 extending from a fluid cylinder 44. The other end of the cylinder 44 is mounted within a bracket 45 on the top of the cross beam 14.

The rear pivot arm 37 also has a pair of opposed extensions 51 and 52 which extend horizontally outwardly from the top of the post 33, so that the pivot arms 36 and 37 are substantially identical. A connecting bar 53 is pivotally mounted to the front pivot arm extension 42 on one end and to the rear pivot arm extension 52 on the other end, so that the connecting bar 53 extends horizontally across the top of the beam 14 from the front of the beam to the rear of the beam. The connecting bar 53 interconnects the two pivot arms 36 and 37, assuring that the pivot arms rotate together. Since each of the pivot arms 36 and 37 is secured to the top of one of the locking posts 32 and 33, the connecting bar 53 also assures that both of the locking posts will rotate together.

When the piston rod 43 is retracted into the cylinder 44, the front pivot arm extension 41 engages a stop block 57 mounted on the top of the cross beam 14 and extending upwardly to engage the pivot arm 36. The position of the stop block 57 assures that rotation of the pivot arm 36, and thus rotation of the post 32 will be limited in one direction by engagement of the extension 41 with the stop block 57 and not by the amount of retraction of the piston rod 43 into the cylinder 44. When the piston rod 43 is fully extended from the cylinder 44, the other front pivot arm extension 42 engages another stop block 58. The stop block 58, like the stop block 57, is mounted on the top of the cross beam 14 and extends upwardly to engage the pivot arm 36. The position of the stop block 58 assures that rotation of the pivot arm 36, and thus rotation of the post 32 will be limited in other direction by engagement of the extension 42 with the stop block 58 and not by the range of extension of the piston rod 43 from the cylinder 44.

Figure 5:
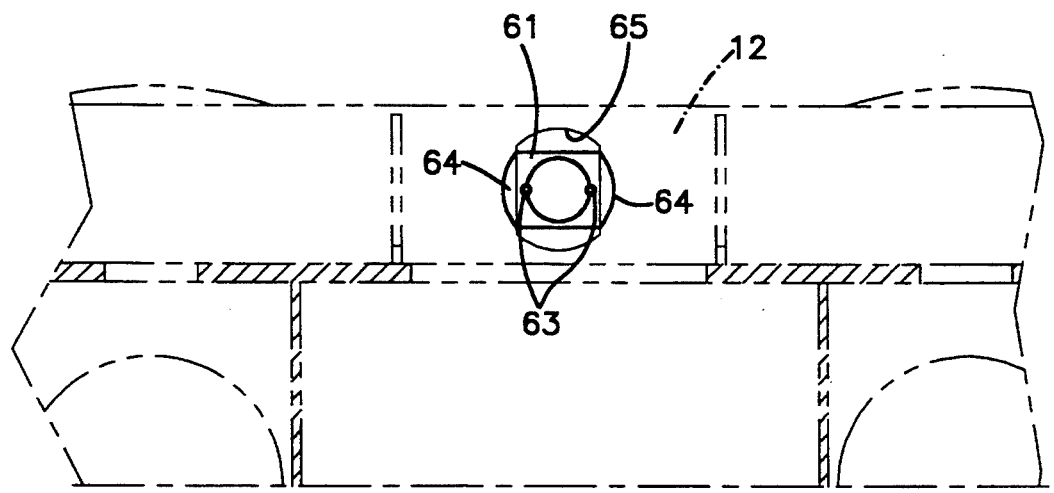
FIG. 5 is a bottom plan view taken along line 5—5 of FIG. 2 showing the locking mechanism in the locked position.
Figure 7:
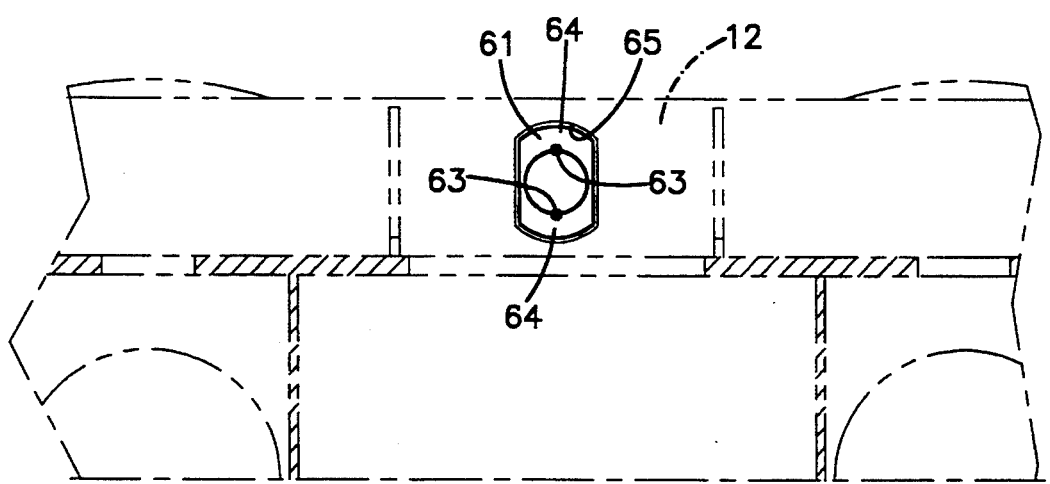
FIG. 7 is a bottom plan view similar to FIG. 5 showing the locking mechanism in the unlocked position.

On the bottom of the locking posts 32 and 33 are T-blocks 61 and 62. The T-block 61 is secured to the bottom of the front post 32 with dowels 63, and the T-block 62 is similarly mounted on the bottom of the rear post 33. The T-blocks 61 and 62 are substantially identical, and both will be described with reference to the T-block 61 for the front post 32 shown in FIGS. 5 and 7. The T-block 61 is the shape of a partial cylinder with portions of the cylinder removed beyond the shape of an included rectangular prism, so that the T-block 61 has opposed locking keyed portions 64. The T-block 61 fits within a corresponding shaped opening 65 in the base 12. With the post 32 rotated so that the T-block 61 fits within the opening 65, the bottom of the post 32 can be inserted into the opening in the base 12, as shown in FIG. 7, as the beam 14 lowers into position to close the press. When the T-block 61 is in the opening 65, rotation of the post 32 causes the T-block to rotate so that the keyed portions 64 of the T-block move out of alignment with the opening, as shown in FIG. 5. The keyed portions 64 engage the base 12 adjacent to the opening 65 and prevent the bottom of the post 32 from being pulled upwardly.

Figure 4:
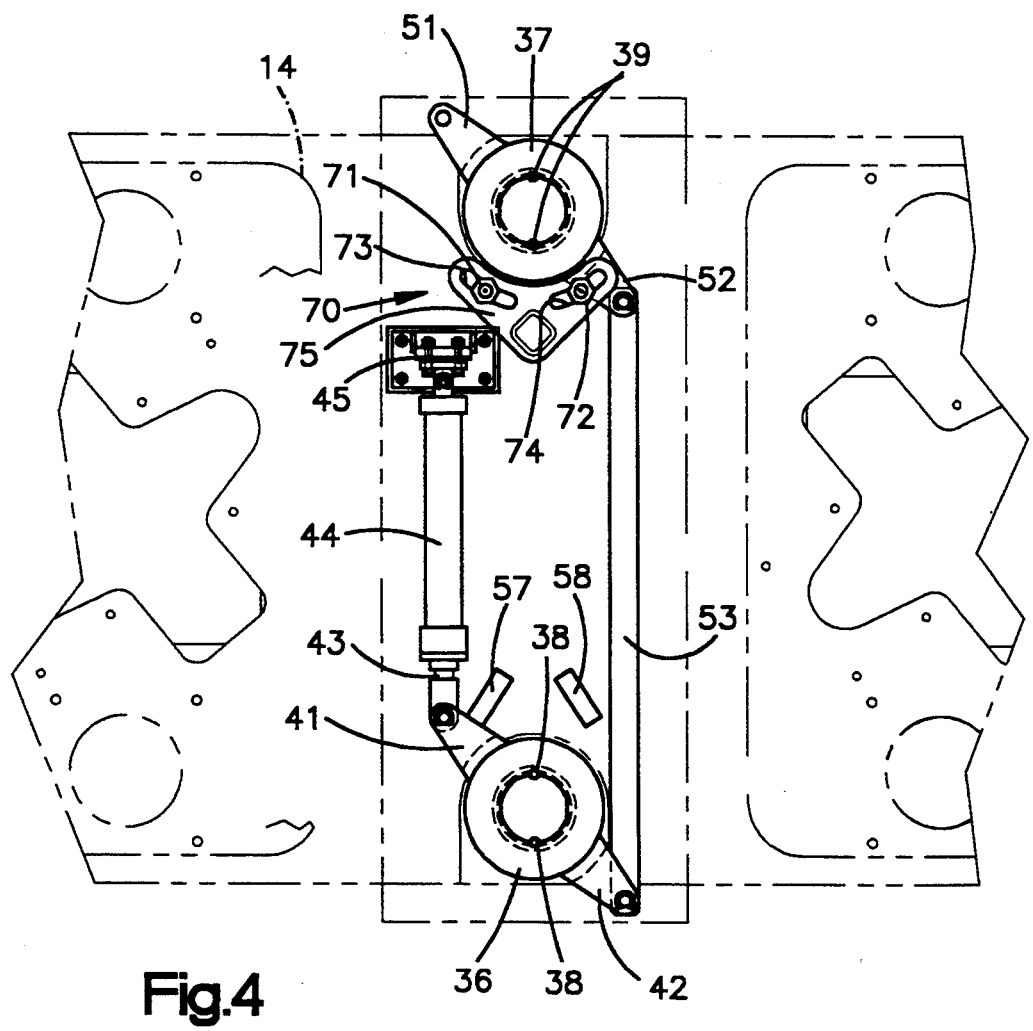
FIG. 4 is a top plan view taken along line 4—4 of FIG. 2 showing the locking mechanism in the locked position.
Figure 6:
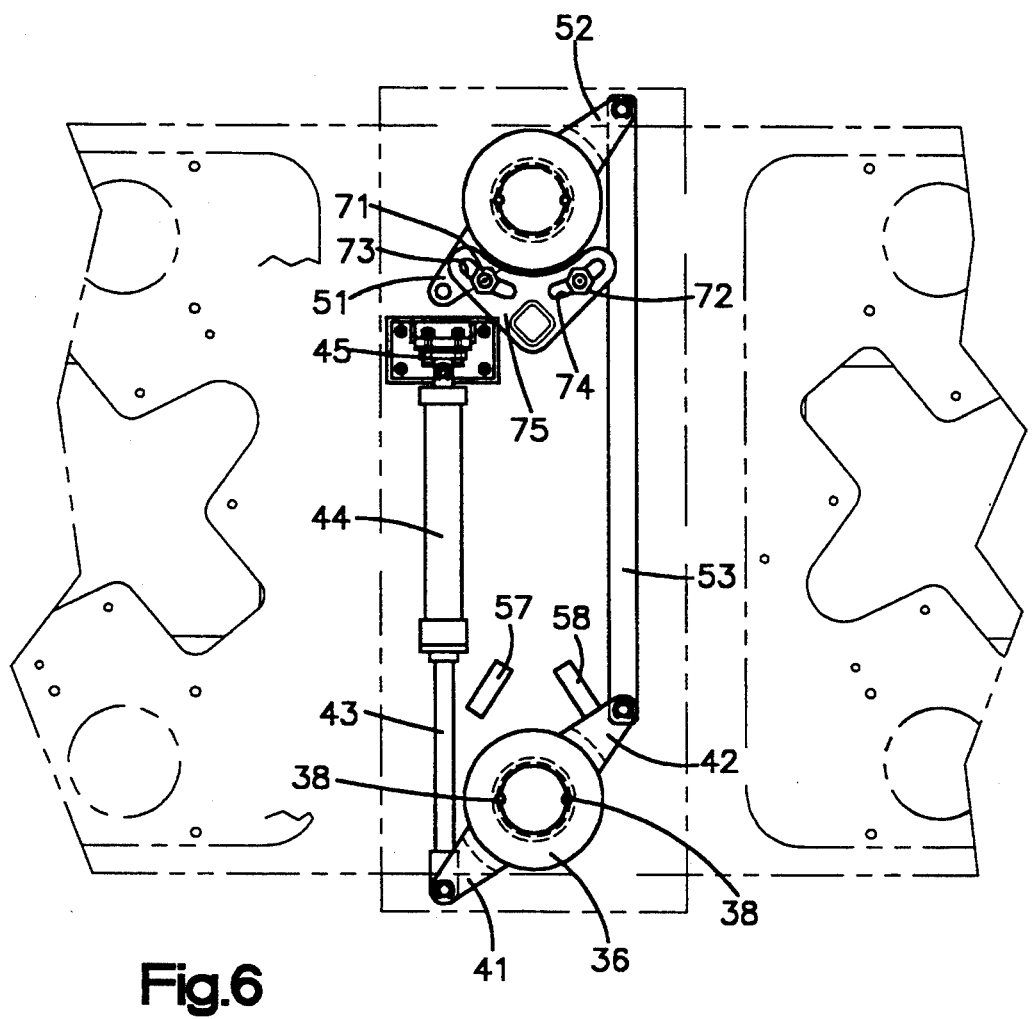
FIG. 6 is a top plan view similar to FIG. 4 showing the locking mechanism in the unlocked position.

To monitor proper operation of the locking mechanism, a switch assembly 70 is provided. The switch assembly 70 includes a pair of suitable switches 71 and 72 mounted within adjustable slots 73 and 74 on a bracket 75 welded to the top of the cross beam 14 adjacent to the rear pivot arm 37. The switch 71 detects the extension 51 when the pivot arm 37 is in the unlocked position as shown in FIG. 6. The other switch 72 detects the extension 52 when the pivot arm 37 is in the locked position as shown in FIG. 4.

Assembly

The beam locking mechanism 30 must be carefully assembled so that it operates precisely and effectively. In particular, it is important that the pivot arms 36 and 37 are in registry with the T-blocks 61 and 62 so that actuating of the cylinder 44 has the desired effect of locking and unlocking both of the posts 32 and 33.

To assemble the locking mechanism, the bearings 34 are first installed in the openings 35 in the cross beam 14. The pivot arms 36 and 37 are mounted on the top of the posts 32 and 33. Thrust washers are slipped over the posts 32 and 33, and the posts are inserted down through the openings in the cross beam 14 through the bearings, while making sure that the thrust bearings stay in position. The T-blocks 61 and 62 are then threaded onto the bottom of the posts 32 and 33. The connecting bar 53 is then installed by mounting it to the pivot arm extensions 42 and 52. The cylinder and piston rod assembly 43 and 44 is next assembled and installed.

The front pivot arm 36 is then rotated until it is in the locked position as shown in FIG. 4 with the piston rod 43 substantially retracted into the cylinder 44, but not fully retracted, and the extension 41 engaging the stop block 57. The stop block 57 is then secured to the top of the cross beam 14 if it has not already been. After confirming that the press is fully closed and that the pivot arm extension 41 is tightly engaged against the stop block 57, the T-block 61 on the bottom of the post 32 is positioned so that it is rotated 90° away from the position in which the T-block 61 fits through the opening 65, i.e., so that the T-block is in the locked position as shown in FIG. 5. The dowels 38 are then inserted to secure the pivot arm 36 to the top of the post 32, and the dowels 63 are inserted to lock the T-block 61 onto the bottom of the post 32. Preferably, a small clearance, on the order of 0.005 inches, is provided between the top of the T-block 61 and the seat around the bottom of the opening 65.

The front pivot arm 36 is then rotated to its unlocked position as shown in FIGS. 6 and 7 with T-block 61 in alignment with the opening 65 so that the bottom of the post 32 can be removed from the base 12. The stop block 58 is then positioned so that it firmly engages the pivot arm extension 42, and the stop block is secured to the top of the cross beam 14.

With the press fully closed, and with the front pivot arm 36 positioned with the extension 41 firmly engaging the stop block 57, the T-block 62 on the bottom of the rear post 33 is positioned so that it is rotated 90° away from the position in which the T-block fits through its opening, i.e., so that the T-block is in the locked position. The T-block 62 is then secured to the bottom of the post 33 by inserting dowels similar to the dowels 63. As with the T-block 61, a small clearance, on the order of 0.005 inches, is preferably provided between the top of the T-block 62 and the seat around the bottom of its opening. The pivot arm 36 is then rotated so that the T-block 62 on the bottom of the rear post 33 can be removed through its opening 66 in the base 12, and with the extension 42 tightly engaging the stop block 58, the pivot arm 37 is secured to the top of the rear post 33 by insertion of the dowels 39. Finally, the switches 71 and 72 and the bracket 75 are installed on the top of the cross beam 14 adjacent to the pivot arm 37.

Operation

The operation of the locking mechanism 30 of the present invention can be explained with reference to the conventional operation of a tire press. With the tire press 10 open, the cross beam 14 is moved to the rear of the press clear of the base 12, and the press is loaded with a uncured tire carcass using a conventional loader. When the tire carcass is in place, the press begins to close by movement of the cross beam 14, first horizontally and then vertically. As the press finishes its closing operation, the cross beam 14 moves vertically down.

The pivot arm 36 is in its unlocked position, as shown in FIG. 6, with the extension 42 engaging the stop block 58, and the cylinder 44 actuated to extend the piston rod 43 from the cylinder to maintain the extension 42 firmly against the stop block 58. With the pivot arm 36 in this position, the T-blocks 61 and 62 are oriented so as to fit within the openings 65 and 66 as shown in FIG. 7, and the bottom of the posts 32 and 33 are thus inserted into the openings 65 and 66 in the base 12. When the press has fully closed, the cylinder 44 is actuated to withdraw the piston rod 43 into the cylinder, rotating the pivot arm 36, and rotating the pivot arm 37 which is attached to the pivot arm 36 by the connecting bar 53, until the extension 41 engages the stop block 57 as shown in FIG. 4. The extension 41 is driven into firm engagement with the stop block 57 by the cylinder 44. The posts 32 and 33 are thus each rotated 90°, and the T-blocks 61 and 62 are correspondingly rotated 90° to the locked position as shown in FIG. 6. The tire press 10 then preforms the conventional tire curing operation. As the tire cures, the pressures that occur in the tire curing process would normally result in an upward force applied to the cross beam 14 which would otherwise result in a bowing or upward bending movement of the middle of the cross beam. This bowing or bending is prevented by the locking posts 32 and 33. The bottom of the posts 32 and 33 is locked in place in the base 12 by engagement of the T-blocks 61 and 62 with the seat around the bottom of the openings 65 and 66. The tops of the posts 32 and 33 are locked in place on the cross beam 14 by engagement of the pivot arms 36 and 37 on the top of the cross beam. Thus the posts 32 and 33 which are located at approximately the middle of the cross beam 14, prevent undesirable bowing or bending of the middle of the cross beam when the cross beam is subjected to the substantial forces produced during the tire curing operation.

After curing is complete and before the press is opened, the cylinder 44 is actuated to extend the piston rod 43 from the cylinder, causing rotation of the pivot arm 36 and rotation of the pivot arm 37 which is attached to the pivot arm 36 by the connecting bar 53, until the extension 42 engages the stop block 58 again as shown in FIG. 6. Continued actuation of the cylinder 44 causes the extension 42 to firmly engage the stop block 58 to assure that the locking mechanism is precisely in the unlocked position as shown in FIG. 6. With the mechanism in the unlocked position, the T-blocks 61 and 62 are in alignment with the openings 65 and 66 and the bottom of the posts 32 and 33 may be removed from the base 12 as shown in FIG. 7. The press can then be opened by moving the cross beam 14 upwardly in a conventional manner to remove the finished tire from the mold. The cross beam 14 is then moved horizontally toward the rear of the press to deposit the finished tire on the conveyor in the conventional manner.

In the event of a failure of the locking mechanism 30, it is desirable that operation of the tire press be halted until the failure is corrected. For example, if the connecting bar 53 were to break, the rear post 33 would not rotate properly although the cylinder 44 would continue to function, and an attempt to open or close the press with the rear T-block 62 in the locked position could result in damage to components of the locking mechanism or damage to other components of the press. Such failures are detected by the switch assembly 70. The switch 71 engages the pivot arm extension 51 when the pivot arm 37 is in the unlocked position as shown in FIG. 6, and the switch 72 engages the extension 52 when the pivot arm 37 is in the locked position as shown in FIG. 4. The signals from the switches 71 and 72 are connected to the control system of the tire press to halt operation of the press if the position of the locking mechanism is inconsistent with the desired position.

Other variations and modifications of the specific embodiments herein shown and described will be apparent to those skilled in the art, all within the intended spirit and scope of the invention. For example, while the invention has been shown with respect to a slide-back bagwell press, it may be used on post-type presses as well as bagwell presses, and it may be used on tilt-back presses as well as slide-back presses. While the invention has been shown and described with respect to particular embodiments thereof, these are for the purpose of illustration rather than limitation. Accordingly, the patent is not to be limited in scope and effect to the specific embodiments herein shown and described nor in any other way this is inconsistent with the extent to which the progress in the art has been advanced by the invention.

What is claimed is:

1. A dual tire press which comprises:
   a base for supporting a pair of lower mold sections;
   a pair of side plates one secured at each end of the base, each of the side plates having a guide slot therein;
   a pair of crank wheels one journalled in each end of the base;
   a cross beam having cam followers at each end which move within the guide slots, the cross beam supporting a pair of upper mold sections, the cross beam being movable vertically toward and away from the base and horizontally toward and away from the base to open and close the tire press;
   a pair of links, each link connected at one end to one of the crank wheels and connected at the other end to the cross beam to move the cross beam toward and away from the base to open and close the tire press as the crank wheel turns; and
   a locking mechanism provided only at a location generally midway between the side plates, the locking mechanism attached at one end to the cross beam and attached at the other end to the base for maintaining a fixed distance between the cross beam and the base and for reducing bending of the middle of the cross beam.

2. A tire press as recited in claim 1 wherein the locking mechanism is mounted at the one end to the cross beam and extends downwardly from the cross beam.

3. A tire press as recited in claim 2, wherein the locking mechanism as removably attached at the other end to the base.

4. A tire press as recited in claim 2, wherein the locking mechanism includes means for releasably securing the locking mechanism to the base.

5. A dual tire press which comprises
   a base for supporting a pair of lower mold sections;
   a pair of side plates one secured at each end of the base, each of the side plates having a guide slot therein;
   a pair of crank wheels one journalled in each end of the base;
   a cross beam having cam followers at each end which move within the guide slots, the cross beam supporting a pair of upper mold sections, the cross beam being movable toward and away from the base to open and close the tire press;
   a pair of links, each link connected at one end to one of the crank wheels and connected at the other end to the cross beam to move the cross beam toward and a way from the base to open and close the tire press as the crank wheel turns; and
   a locking mechanism provided only at a location generally midway between the side plates, the locking mechanism having one end attached to the middle of the cross beam and extending downwardly from the cross beam, and having the other end removably attached to the base.

6. A tire press as recited in claim 5, wherein the locking mechanism includes a vertically extending post.

7. A tire press as recited in claim 6, wherein the post is rotatable.

8. A tire press as recited in claim 7, wherein the locking mechanism includes a T-block secured to the bottom of the post, the T-block fitting within a corresponding opening in the base to insert the bottom of the post into the opening, the T-block being prevented from fitting within the opening when rotated to secure the bottom of the post to the base.

9. A dual tire press which comprises:

a base for supporting a pair of lower mold sections;

a pair of side plates one secured at each end of the base, each of the side plates having a guide slot therein;

a pair of crank wheels one journalled in each end of the base;

a cross beam having cam followers at each end which move within the guide slots, the cross, beam supporting a pair of upper mold sections, the cross beam being movable toward and away from the base to open and close the tire press;

a pair of links, each link connected at one end to one of the crank wheels and connected at the other end to the cross beam to move the cross beam toward and away from the base to open and close the tire press as the crank wheel turns;

a locking mechanism provided only at a location generally midway between the side plates, the locking mechanism attached at one end to the cross beam and attached at the other end to the base for maintaining a fixed distance between the cross beam and the base, the locking mechanism movable between a locked position in which it is attached to both the cross beam and the base and an unlocked position in which it is removable from one of the cross beam and the base; and means for monitoring the positions of the locking mechanism.

10. A tire press as recited in claim 9 wherein the monitoring means includes contact switch means engagable by a portion of the locking mechanism.

11. A tire press as recited in claim 1 wherein the locking mechanism is located only between the pair of upper mold sections and between the pair of lower mold sections.

12. A tire press as recited in claim 5 wherein the locking mechanism is located only between the pair of upper mold sections and between the pair of lower mold sections.

* * * * *

UNITED STATES PATENT AND TRADEMARK OFFICE
CERTIFICATE OF CORRECTION

PATENT NO. : 5,447,424
DATED : September 5, 1995
INVENTOR(S) : Donald C. Imler & Dirk A. Keller It is certified that error appears in the above-indentified patent and that said Letters Patent is hereby corrected as shown below:

Col. 4, line 27 after 1 delete "," and insert --.--

Col. 5, line 5 after "is" delete --fully--

Col. 8, line 61 delete "a way" and insert --away--

Col. 9, line 20 after "cross" delete --,--

Signed and Sealed this

Twenty-eighth Day of November 1995

Attest:

BRUCE LEHMAN

Attesting Officer          Commissioner of Patents and Trademarks